2,897,213

9-BETA-HYDROGEN-11-KETO STEROIDS

Ewart Ray Herbert Jones, Harold Bernard Henbest, and Gilbert Frederick Woods, Manchester, David Ernest Hathway, Wembley, and Gordon Haydn Thomas, Acton, London, England, assignors to Glaxo Laboratories Limited, Greenford, England, a British company No Drawing. Application May 21, 1953
Serial No. 356,906

Claims priority, application Great Britain
May 22, 1952

19 Claims. (Cl. 260—397.2)

This invention is concerned with improvements in or relating to the preparation of steroid substances of a novel-type, the structural characteristics of which essentially comprise a β-hydroxy or esterified β-hydroxy group in the 3-position, an α-hydrogen atom or α-hydroxy or α-acyloxy group in the 5-position, a hydrogen atom in the iso- or β-configuration in the 9-position and a keto group in the 11-position.

Very few steroids have hitherto been described, as far as we can ascertain in which the hydrogen atom in the 9-position has the β-configuration and indeed the type of reaction by which we have found our new compounds can be prepared is also novel. The configuration of the 9-hydrogen atom is proved by the fact that it can be made to revert to the normal configuration by treatment with alkali as described below. While it is extremely difficult to obtain evidence on the point we believe the configuration at position 8 is natural.

The structural characteristics of the said new steroids will be apparent from the following schematic representation:

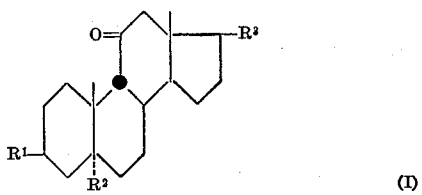

(I)

where $R^1$ is a hydroxy or esterified hydroxy group (in the β-position), $R^2$ is an α-hydrogen atom or an α-hydroxy or α-acyloxy group and $R^3$ is a side chain substituent, the nature of which will be described hereinafter.

The herein described new steroids are we believe, generally useful in the production of 11-oxygenated steroids and several members of the new class are valuable intermediates in the synthesis of cortisone in that they can readily be prepared as hereinafter described and can be converted to cortisone by known procedures once the configuration of the 9-position has been reversed by a method to be described later in this application. Thus after reversal of the 9-hydrogen, degradation of the side chain and elaboration of the 3-keto-Δ⁴-system can be readily effected.

For example, 3β-acetoxy-11-keto-9β-ergost-22-ene, one of the new compounds of this application, can be treated with strong alkali, as will be described hereinafter, and converted to the 3β-acetoxy-11-keto ergost-22-ene having the normal configuration at the 9-position. According to the procedure outlined in Chamberlin et al., J. Amer. Chem. Soc., 1951, 73, 2396, this last mentioned steroid compound can readily be converted to 3β-acetoxy-11:20-diketoallopregnane and this compound can in turn be converted to cortisone by procedures outlined in Tishler et al., J. Amer. Chem. Soc., 1951, 73, 4052, and Rosenkranz et al., Nature, 1951, 168, 28.

As stated above the new steroids can be prepared by a reaction which we believe of itself to be novel and which comprises the hydrogenation of such steroids as have a β-hydroxy or esterified β-hydroxy group in the 3-position, a hydrogen atom or α-hydroxy or α-acyloxy group in the 5-position, a double bond in the 7-position, a keto group in the 11-position, the 9-hydrogen atom of which has the β-configuration; steroids of this last-mentioned type may be schematically represented as follows:

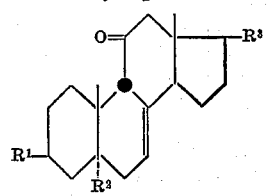

(II)

where $R^1$, $R^2$ and $R^3$ have the above-stated meanings. It is to be noted that hydrogenation of a Δ⁷:⁸-double bond in a steroid having the normal configuration at the 9-position produces migration of a 7:8-double-bond to the 8:9- or 8:14-positions. This fact has also hitherto proved an obstacle in steroid chemistry and in particular in the synthesis of cortisone, in that the reduction of most compounds having 8:9- and 8:14-double-bonds is not easily effected. In contrast the reduction of the Δ⁷:⁸-double bond in the preparation of our new compounds proceeds easily and smoothly. This curious behaviour can, we presume be attributed to the particular structural characteristics of the starting material at the 9-position.

Accordingly the invention comprises as new compounds, such steroids as have a β-hydroxy or esterified β-hydroxy group in the 3-position, an α-hydrogen atom or an α-hydroxy or α-acyloxy group in the 5-position and a keto group in the 11-position, the hydrogen atom in the 9-position having a β-configuration.

In that the herein described new type of compound is of particular value in the synthesis of cortisone the invention specifically includes such of the new class of steroid as have one of the following side-chains in the 17-position:

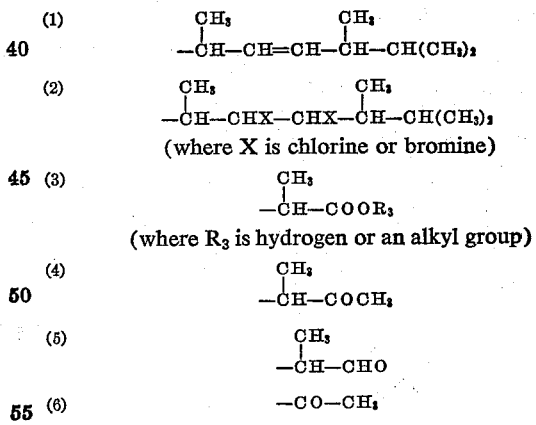

since such side-chains are easily degraded or converted into the cortisone side-chain; we find compounds having side-chain No. 2 (where X is bromine) to be particularly valuable. We also prefer such compounds as have an acyloxy group in the 3β-position particularly an acetyloxy group, and an α-hydrogen atom or an α-hydroxy or α-acyloxy (e.g. acetyloxy group) in the 5-position.

For the purposes of illustration the following are the characteristics of two specific and preferred compounds within the said new class:

3β-acetoxy-22:23-dibromo-11-keto-9β-ergostane
M.P.=226–230° C.
$[\alpha]_D = +30°$ (c. 1.0 in chloroform)

3β-acetoxy-11-keto-9β-ergost-22-ene
M.P.=170–173° C.
$[\alpha]_D = +20°$ (c. 1.0 in chloroform)

It will be understood that the foregoing characteristics were determined for the purest material we have been able to obtain and may be liable to variation dependent on the purity of any particular sample of the compound in question.

According to a further feature of the invention the herein described new steroids are prepared by catalytically hydrogenating such steroids as have a β-hydroxy or esterified hydroxy group in the 3-position, a hydrogen atom or an α-hydroxy or α-acyloxy group in the 5-position, a double bond in the 7-position and a keto group in the 11-position (the hydrogen atom in the 9-position having the β-configuration) in the presence of an inert organic solvent.

We prefer to effect the herein described reaction on such starting materials as have the specific side-chains 1–6 hereinbefore referred to; it should however be noted that the hydrogenation conditions of the reaction may cause reduction of reducible groups in the side-chain and that a "protected" type of side-chain is advantageous; thus to obtain $\Delta^{22}$ compounds we prefer to hydrogenate compounds having side-chains of the type No. 2 and then to dehalogenate the resulting compound for example by treatment with zinc and acetic acid.

The catalyst employed may be any of the normal catalysts employed in reactions involving the hydrogenation of double-bonds, such as platinum and palladium catalysts and preferred examples are Adams' platinum oxide and palladised charcoal.

The solvent employed should of course be inert under the prevailing reaction conditions and a suitable solvent is glacial acetic acid, either alone or admixed with dioxan or chloroform.

The reaction is conveniently effected at room temperature for example by shaking a solution of the starting material in an atmosphere of hydrogen. The optimum pressure for the reaction appears to vary according to the nature of the starting material and can be determined by preliminary test.

We have found that the starting materials used in the process according to the invention can conveniently be prepared by the action of a Lewis acid on steroids having a β-hydroxy or esterified β-hydroxy group in the 3-position, an α-hydrogen atom, or an α-hydroxyl or α-acyloxy group in the 5-position, a 7:8-double bond and an oxide bridge between the 9- and 11-positions, care being taken to stop the process at the appropriate time.

Heusser et al. (Helv. Chim. Acta, 1951, 34, 2106) have described the preparation of compounds which are similar to those of Formula II above, but which have the double bond in the 8(9) position instead of the 7-position, from compounds the essential features of which may be schematically represented as follows:

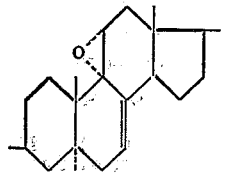

by the action of boron trifluoride.

The said process for the preparation of compounds of Formula II above is analogous to that of Heusser et al. above mentioned, but care is taken to stop the process at the appropriate time. Apparently the process described by Heusser may have passed through an intermediate 11-keto-$\Delta^7$-9β-steroid which however was unrecognised. Our observations show that we can bring about the type of reaction described by Heusser et al. in such a way that it can be stopped at the desired intermediate which can then be isolated; furthermore when using the actual conditions and type of compound (with hydrogen in the 5-position) described by Heusser the reaction proceeded very quickly and any of the desired new compounds which was formed was quickly converted to the $\Delta^{8(9)}$-type of compound.

It will be observed that as the reaction proceeds the optical rotation drops until a minimum is reached which corresponds to the maximum quantity of 11-keto-$\Delta^7$-9β-steroid. If the reaction is allowed to proceed further the latter compound is rearranged to form a $\Delta^{8(9)}$-11-ketone and the rotation again increases during such rearrangement. The reaction should therefore be stopped at the stage when the optical rotation of the reaction mixture reaches a minimum. As stated above the reaction according to the invention is inclined to proceed rather rapidly thus making it difficult to stop it at the required stage; it should therefore be slowed down either by the use of only small quantities of the Lewis acid or by suitable choice of solvent as hereinafter described. The reaction may be stopped for example by quenching with water or pyridine.

According to a further feature of the invention therefore, we provide a process for the preparation of the starting materials for the process according to the invention, in which a 3β-hydroxy (or esterified hydroxy)-$\Delta^7$-9:11-oxido steroid which may or may not have a hydroxy or acyloxy group in the 5-position is reacted in an inert organic solvent with a Lewis acid, as hereinafter defined, the reaction being stopped at the stage where the optical rotation of the reaction mixture reaches a minimum.

The term "Lewis acid" as used herein has the meaning generally assigned to it in the art at this time, namely a substance which is capable of acting as an electron acceptor for at least two electrons; the term does not, of course, include any substance which is itself capable of dissociation with the formation of hydrogen ions. An explanation of the term "Lewis acid" may be for example be found on page 80 of "Advanced Organic Chemistry" by Wheland, 2nd edition, published by John Wiley & Sons, Inc., New York.

Preferred examples of Lewis acids for the herein described process are boron trifluoride (conveniently used as its etherate) and stannic chloride.

As stated above it is important to slow the reaction as much as possible so that it may be stopped at the desired point. While any inert organic solvent may be used in the process we have found that the speed of the reaction is greatly influenced by the nature of such solvent. Thus in benzene the reaction takes place very rapidly while in ether it is much slower; we therefore prefer to employ an aliphatic ether as the solvent for example diethyl ether or tetrahydrofuran.

The rate of reaction is also influenced by the quantity of Lewis acid employed and if the reaction is proceeding too quickly under given conditions it can be slowed by using less Lewis acid. We prefer to employ from 0.1 to 1.5 mols of the Lewis acid per mol of starting material. The process is conveniently carried out at temperatures whithin the range of from $-40°$ to $+40°$ C.

We have found further that the configuration of the 9-hydrogen atom in the new hydrogenated compounds according to the invention can be reversed to give the normal, 9α-configuration. We have found that this inversion may be effected by subjecting the new compounds according to the invention to a treatment with alkali so as to cause ionisation of the 9-hydrogen atom (presumably by reason of keto-enol tautomerism of the 11-keto group) under which conditions the 9-hydrogen atom is observed to revert to its normal configuration. This inversion is accompanied by a change in the optical rotation which feature can usefully be employed to control the reaction. Thus the rotation of the 9α-compounds is more negative than that of the 9β-compounds.

In using this characteristic to determine what conditions are suitable care should be taken to base the comparison on compounds with hydroxy groups in the 3- and 5-positions and side-chains in the 17-position which will not be affected. Thus we have found that strong alkaline conditions are required to effect the desired inversion and whether any given conditions are sufficiently strong can be determined by observing whether the rotation becomes more negative. The conditions of the process will of course, saponify any ester groups in the 3- or 5-positions and thus 3 and/or 5-esters are not obtained by this process. If 3- and/or 5-esters are required, these may be obtained by re-esterification.

According to a still further feature of the present invention, therefore, we provide a process for the preparation of steroid substances, whose nucleus may be represented by the following general formula,

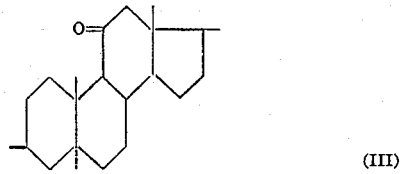

(III)

in which the new compounds according to the invention are subjected to strong alkaline conditions.

We prefer to achieve the strong alkaline conditions required by the use of alkali metal hydroxides, such as sodium or potassium hydroxide in alcoholic or aqueous alcoholic solution or alkali metal alkoxides in alcoholic solution or in suspension in an inert solvent such as ether or benzene. A 15% w./v. solution of potassium hydroxide in ethanol has, for example, proved to be convenient.

The reaction is conveniently carried out at a temperature within the range of from 0–200° C. preferably by boiling a mixture of the reactants. The time required for the process depends on the temperature employed and completion of the reaction can be determined by determining when the rotation ceases to become more negative.

It must of course be remembered that some $C_{17}$ side-chains will be sensitive to the conditions of the process according to the invention while otherwise suitable for easy conversion to the cortisone side-chain. In such cases they can be protected in known manner. Thus while in preceding stages we have found 22:23-dibromoergostane derivatives to be especially convenient, for the present process the bromine should previously be removed, for example by treatment with zinc and glacial acetic acid.

In order that the invention may be well understood the following examples are given by way of illustration only:

A. PREPARATION OF COMPOUNDS OF FORMULA I

Example 1

Hydrogenation of 3β-acetoxy-11-keto-9β-ergosta-7:22-diene.—3β-acetoxy-11-keto-9β-ergosta-7:22-diene (4.596 g.) was dissolved in acetic acid (300 ml.) and the solution shaken with Adams' catalyst (508 mg.) in an atmosphere of hydrogen for 15 minutes. Two mole. equivalent of hydrogen was absorbed in ca. 5 minutes, after which no more hydrogen was taken up. After filtration, the solution was evaporated to dryness in vacuo and the residue crystallised from methanol. 3β-acetoxy-11-keto-9β-ergostane (4.020 g.) separated as rods, M.P. 150–151°, [α]$_D$ +45° (c., 1.0 in chloroform). (Found: C, 78.60; H, 11.10. $C_{30}H_{50}O_3$ required C, 78.55; H, 10.99%.) A mixture of this compound and 3β-acetoxy-11-keto-ergostane melted at 116–121°. The infra-red spectrum showed bands at 1735 and 1235 cm.$^{-1}$ (acetoxy groups, 1720 cm.$^{-1}$ (unconjugated carbonyl). The compound had negligible absorption in the U.V. above 200 mμ.

Example 2

(a) Hydrogenation of 3β-acetoxy-22:23-dibromo-11-keto-9β-ergost-7-ene.—3β - acetoxy - 22:23 - dibromo - 11- keto-9β-ergost-7-ene (5 g.) in chloroform (50 ml.) and acetic acid (100 ml.) were shaken with Adams' catalyst (1 g.) in an atmosphere of hydrogen until one mole. equivalent of hydrogen was absorbed (ca. one hour). After filtration, the solution was evaporated to dryness in vacuo and the residue crystallised from ethyl acetate. 3β-acetoxy-22:23-dibromo-11-keto-9β-ergostane (2.7 g.) was obtained as rectangular plates, M.P. 226–230°; [α]$_D$ +30° (c., 1.0 in chloroform.) (Found: C, 58.6; H, 8.0. $C_{30}H_{48}O_3Br_2$ required C, 58.4; H, 7.9%.) The infra-red spectrum showed bands at 1735 and 1235 cm.$^{-1}$ (acetoxy group) and 1725 cm.$^{-1}$ (unconjugated carbonyl). The compound had negligible absorption in the U.V. above 220 mμ.

(b) Debromination of 3β-acetoxy-22:23-dibromo-11-keto-9β-ergostane.—3β-acetoxy-22:23-dibromo - 11-keto-9β-ergostane (2 g.) in chloroform (40 ml.) and acetic acid (80 ml.) was stirred at room temperature with zinc dust (10 g.) for 2 hours. The solution was filtered and diluted with water (200 ml.). The chloroform layer (diluted to 100 ml.) was washed with water (100 ml.), saturated aqueous sodium bicarbonate (100 ml.) and water (2 x 100 ml.) and then evaporated to dryness. Crystallisation of the residue from methanol afforded 3β-acetoxy-11-keto-9β-ergost-22-ene (1.2 g.) as plates, M.P. 170–173°, [α]$_D$ +20° (c., 1.0 in chloroform). (Found: C, 78.87; H, 10.64. $C_{30}H_{48}O_3$ required C, 78.89; H, 10.60%.) Bands were found in the infra-red spectrum at 1735 and 1240 cm.$^{-1}$ (acetoxy group), 1715 cm.$^{-1}$ (unconjugated carbonyl) and at 970 cm.$^{-1}$ (side chain double bond).

Example 3

3β:5α - diacetoxy - 11 - keto - 9β - ergostane.—3β:5α - diacetoxy - 11 - keto - 9β - ergosta - 7:22 - diene (4 g.) acetone solvate was dissolved in acetic acid (500 ml.) and the solution shaken with Adams' catalyst (400 mg.) in an atmosphere of hydrogen. Two molecular equivalents of hydrogen were absorbed in 10 minutes. After filtration, the solution was evaporated to dryness in vacuo and the residue crystallised from methanol when 3β:5α-diacetoxy-11-keto-9β-ergostane (3 g.) was obtained as plates, M.P. 127–130°; [α]$_D$ +62° (c., 1.0% in chloroform). The compound had only slight general absorption in the U.V. above 200 mμ. The infra-red spectrum in $CS_2$ showed bands at 1735 and 1236 cm.$^{-1}$ (acetoxy groups) and at 1725 cm.$^{-1}$ (unconjugated carbonyl). (Found: C, 74.25; H, 9.87. $C_{32}H_{52}O_5$ requires C, 74.40; H, 10.1%.)

Example 4

3β - acetoxy - 5α - hydroxy - 11 - keto - 9β - bis - norallocholanic acid methyl ester.—3β - acetoxy - 5α - hydroxy - 11 - ketobisnorallochol - 7 - enic acid methyl ester (200 mg.) in glacial acetic acid (1.5 ml.) was shaken vigorously with a platinum catalyst (20 mg. $PtO_2$ prereduced in 0.5 ml. AcOH) in an atmosphere of hydrogen. The rapid uptake of hydrogen ceased after 12 minutes when precisely the equivalent of one molecule had been absorbed. The platinum was filtered and the filtrate evaporated under reduced pressure to a rapidly crystallising clear gum. Recrystallisation from methanol yielded 3β - acetoxy - 5 - hydroxy - 11 - keto - 9β - bis - norallocholanic acid methyl ester as plates (120 mg.), M.P. 187°; [α]$_D^{20}$ +84.4°. (Found: C, 69.45; H, 8.87. $C_{25}H_{38}O_6$ requires C, 69.12; H, 8.75%.) Light absorption: absorption at 207.5 mμ.

$E_{1cm.}^{1\%}$ 13.9 (c., 0.0175 EtOH

Infra-red absorption showed bands at 3420 cm.$^{-1}$ (hydroxyl); 1735, 1235 cm.$^{-1}$ (acetyl); 1700 cm.$^{-1}$ (unconjugated carbonyl); 1730, 1158 cm.$^{-1}$ (ester).

B. PREPARATION OF COMPOUNDS OF FORMULA II

Example 5

3β - acetoxy - 22:23 - dibromo - 11 - keto - 9β - ergost -

7-ene.—3β-acetoxy-22:23-dibromo-9α:11α-epoxy-ergost-7-ene (2 g.) dissolved in dry ethyl ether (200 ml.) was treated with boron trifluoride-ether complex (0.82 ml.; 2 equivs.). After standing at room temperature for 3½ hours the crystalline solid which had separated was collected (0.93 g.), M.P. 194–196°; [α]$_D$ —120°. The ether filtrate was concentrated at room temperature to half its volume and a further batch of solid collected (0.3 g.) [α]$_D$ —117°. The two batches of solid were recrystallised from ethyl acetate to yield the ketone (1.0 g.) as colourless needles, M.P. 194–196°, [α]$_D$ —122° (c., 3.0 in CHCl$_3$). (Found: C, 58.9; H, 7.5. C$_{30}$H$_{46}$O$_3$Br$_2$ requires C, 58.7; H, 7.5.) Light absorption: General absorption $E^{1\%}_{1cm.}$ at 250 mμ = 10

Example 6

3β-acetoxy-22:23-dibromo-9α:11α-epoxyergost-7-ene (1 g.) dissolved in dry benzene (25 ml.) was treated with boron trifluoride-ether complex (0.2 ml.; 1 equiv.). After standing at room temperature for one minute the mixture was shaken vigorously with water. The benzene solution was washed with aqueous sodium bicarbonate and water and the solvent evaporated. The residue was recrystallised from ethyl acetate to yield impure ketone (0.45 g.), M.P. 180–181°, [α]$_D$—113°.

Example 7

3β-acetoxy-11-keto-9β-ergosta-7:22-diene.— 3β-acetoxy-9:11-epoxyergosta-7:22-diene (2.5 g., dried for 3 hours at 100° in a high vacuum), was dissolved in dry distilled benzene (60 cc.) and treated rapidly at 20° with freshly distilled boron trifluoride etherate (10 drops, 0.133 g.). The solution immediately went brown and the reaction was stopped after 1 minute by quenching with water. The benzene solution was washed three times with water, twice with sodium bicarbonate solution, twice more with water and then dried. The solution was evaporated to dryness and the residue crystallised from acetone giving 3β-acetoxy-11-keto-9β-ergosta-7:22-diene (1.95 g.; 78% yield) as elongated prisms, M.P. 157–159°, [α]$_D$ —186.3° (c., 2.27) (in chloroform). After two further crystallisations the M.P. was constant at 159–161°, [α]$_D$ —190.5° (c., 1.16). (Found: C, 79.45; H, 10.4; C$_{30}$H$_{46}$O$_3$ requires C, 79.25; H, 10.2%.) Light absorption in alcohol: max. 2950 A., ε=100.

Example 8

3β-acetoxy-11-keto-9β-ergosta-7:22-diene.— Freshly distilled boron trifluoride etherate (6 ml.) was added to a solution of 3β-acetoxy-9:11α-epoxyergosta-7:22-diene (19 g.) in dry ether (2 l.). The solution was left for 16 hours at room temperature and then washed with water (300 ml.) saturated aqueous sodium bicarbonate (2 x 300 ml.) and water (300 ml.). After rough drying with magnesium sulphate, the solution was evaporated to dryness leaving 3β-acetoxy-11-keto-9β-ergosta-7:22-diene (18.5 g.), M.P. 147–151°, [α]$_D$ —181°. On crystallisation from methanol the βγ-unsaturated ketone (17 g.) was obtained as plates, M.P. 150–152°, [α]$_D$ —186°.

Example 9

3β:5α-diacetoxy-11-keto-9β-ergosta-7:22-diene.—A solution of 3β:5α-diacetoxy-9:11-epoxyergosta-7:22-diene (10 g.) in a mixture of dry benzene (150 ml.) and dry ether (350 ml.) was stored at room temperature with boron trifluoride etherate (5 ml.) for 3 hours. After washing the solution with water (3 x 200 ml.) and roughly drying with magnesium sulphate, it was evaporated to dryness below 50°/12 mm. The residual oil, which slowly solidified, was crystallised from aqueous acetone. The crystals were collected and dried at 100°/12 mm. for 2 hours when 3β:5α-diacetoxy-11-keto-9β-ergosta-7:22-diene (8.5 g.) was obtained with M.P. 140–143°, [α]$_D$ —49° (c., 1.0% in chloroform). (Found: C, 74.75, H, 9.49. C$_{32}$H$_{48}$O$_5$ requires C, 74.95; H, 9.43%.)

$\lambda^{EtOH}_{max.}$ 208 mμ log ε 3.68

Example 10

3β-acetoxy-5α-hydroxy-11-keto-9β-ergost-7:22-diene. —3β-acetoxy-5α-hydroxy-9α:11α-epoxyergosta-7:22-diene (2.15 g.) dissolved in pure sodium dry benzene (75 ml.) was treated with freshly distilled boron trifluoride etherate (24 drops =0.32 g.). The solution was allowed to stand for 10 minutes at room temperature, then shaken well with sodium bicarbonate solution. The benzene layer was washed well with water, dried over anhydrous sodium sulphate and evaporated to dryness. The residue recrystallised from acetone, gave 1.62 g. of 3β-acetoxy-5α-hydroxy-11-keto-9β-ergosta-7:22-diene, as plates, M.P. 174–183°, [α]$_D$ —112° (CHCl$_3$, c.=1.06).

A sample recrystallised for analysis from acetone had M.P. 181–187°, [α]$_D$ —135° (c.=1.33). U.V. absorption maximum 2910 A.: ε=190. (Found: C, 76.3; H, 9.9%. C$_{30}$H$_{46}$O$_4$ requires C, 76.55; H, 9.85%.)

Example 11

3β-acetoxy-5α-hydroxy-11-keto-9β-bisnorallochol-7-enic acid methyl ester.—3β-acetoxy-5α-hydroxy-9:11-oxidobisnorallochol-7-enic acid methyl ester (500 mg) in dry benzene (50 ml.) was treated with boron trifluoride-ether complex (5 drops) and allowed to stand 5 minutes. It was then washed with sodium bicarbonate solution, water, dried and evaporated. The solid product was recrystallised from methanol. Small rod-like needles of 3β-acetoxy-5α-hydroxy-11-keto-9β-bisnorallochol-7-enic acid methyl ester (300 mg.), M.P. 169–170°, were obtained. Recrystallisation from methanol gave needles M.P. 171–2°, [α]$_D^{20}$ —109° (1:97 in CHCl$_3$). Light absorption: λ max. 206.5 mμ

$E^{1\%}_{1cm.}$ 105 (c., 0.00458 in EtOH)

Infrared absorption shows bands at 3520 cm.$^{-1}$ (hydroxy); 1735 and 1242 cm.$^{-1}$ (acetyl); 1708 cm.$^{-1}$ (carbonyl); 1166 cm.$^{-1}$ (ester); 807 and 840 cm.$^{-1}$ (trisubstituted double bond). Analysis.—Found: C, 69.53; H, 8.29; C$_{25}$H$_{36}$O$_6$ requires C, 69.42; H, 8.39.

Example 12

The following experiments were carried out to demonstrate the drop in rotation as reaction proceeds:

(a) Preparation of 3β:5α-diacetoxy-11-keto-9-isoergosta-7:22-diene (Table I).—Stannic chloride (0.3 ml.) was added to dry ether (35 ml.). The white crystalline precipitate of the stannic chloride/ether complex was dissolved by adding dry benzene. To this solution at 20° was added 3β:5α-diacetoxy-9:11-oxidoergosta-7:22-diene (2 g.) dissolved in dry ether (30 g.). The mixture was at first too turbid to follow the reaction by means of its optical rotation, but a similar solution prepared without stannic chloride had a high positive rotation. After 35 minutes the solution had cleared and the rotation had fallen to a negative value. After 260 minutes the rotation of the solution reached a maximum negative value, and thereafter became slowly more positive. The change in rotation with time is tabulated in Table I.

TABLE I

| Time | [α]$_D$ |
| --- | --- |
|  | Degrees |
| 0 | +72 |
| 35 mins. | —8 |
| 45 mins. | —12 |
| 65 mins. | —16 |
| 100 mins. | —21 |
| 170 mins. | —25 |
| 260 mins. | —26.5 |
| 400 mins. | —22 |
| 440 mins. | —20 |

(b) *3β-acetoxy-22:23-dibromo-11-keto-9β-ergost-7-ene in chloroform (Table II)*.—The epoxide (2 g.) was dissolved in chloroform (65 ml.) and boron trifluoride-ether complex (18 drops) added. The rotations after standing at room temperature are shown in Table II; in another experiment, after standing at room temperature for 15 minutes, water was added, and a solid obtained from the chloroform layer after evaporation of the solvent. The solid was recrystallised from acetone to yield crystals (1.0 g.) M.P. 217–224° $[\alpha]_D$ —44.2.

TABLE II

| Time | $[\alpha]_D$ |
| --- | --- |
|  | *Degrees* |
| 0 | −17 |
| 3 mins | −30 |
| 6 mins | −34.2 |
| 9 mins | −35.3 |
| 12 mins | −35.3 |
| 15 mins | −34.2 |
| 18 mins | −33.2 |
| 33 mins | −30 |
| 63 mins | −28 |
| 153 mins | −17 |

(c) *In tetrahydrofuran (Table III)*.—The above epoxide (5 g.) dissolved in tetrahydrofuran (150 ml.) was treated with boron trifluoride-ether complex (1.65 ml.). The change of rotation with time was determined on standing at room temperature and is shown in Table III. In a second experiment after standing at room temperature from one hour, the product was isolated in the usual way. On crystallisation from acetone a solid (2.15 g.) was obtained, M.P. 183–187°; $[\alpha]_D$ —107°.

TABLE III

| Time | $[\alpha]_D$ |
| --- | --- |
|  | *Degrees* |
| 0 | −12 |
| 10 mins | −32.6 |
| 20 mins | −48 |
| 30 mins | −54 |
| 40 mins | −55.7 |
| 50 mins | −57 |
| 55 mins | −57 |
| 65 mins | −57 |
| 85 mins | −57 |
| 120 mins | −57 |

(d) Example 5 was repeated and the change in rotation of the reaction mixture with time was determined; the results are shown in Table IV.

TABLE IV

| Time | $[\alpha]_D$ |
| --- | --- |
|  | *Degrees* |
| 0 | −3 |
| 5 mins | −9.8 |
| 10 mins | −16.3 |
| 20 mins | −22.2 |
| 40 mins | −38 |
| 60 mins | −45 |
| 80 mins | −53 |
| 100 mins | −57 |
| 120 mins | −57 |

Example 13

*3β - acetoxy - 22:23 - dibromo - 9β - ergost - 7 - en - 11-one*.—(a) A solution of 3β-acetoxy-22:23-dibromo-9α:11α-epoxyergost-7-ene (Budziarek et al., J.C.S., 1952, 3410) (50 g.) in toluene (1.5 l.) was concentrated to 1 litre at atmospheric pressure. After precautions were taken to prevent ingress of moisture, the solution was treated with freshly distilled boron trifluoride-etherate (10 ml.; 1 mol.) for 15 minutes at —35°. Pyridine (20 ml.) was then added to the solution, which, after warming to room temperature, was washed successively with water, aqueous sodium bicarbonate, and water, and concentrated in vacuo to 200 ml.; needles (41 g.; 82%) separated with M.P. 195–197°, $[\alpha]_D$ —120°.

Crystallisation from benzene afforded the 11-ketone as needles, M.P. 196–198° $[\alpha]_D$ —123°. (Found: C, 58.6; H, 7.65. $C_{30}H_{46}O_3Br_2$ requires C, 58.65; H, 7.55%.) The compound showed no selective absorption of high intensity above 220 mμ. Infra-red spectrum (in $CS_2$): peaks at 1735 and 1235 (acetate), 1730 (11-ketone), 1654, 821, and 805 cm.$^{-1}$ (trisubstituted nuclear double bond).

C. PREPARATION OF COMPOUNDS OF FORMULA III

Example 14

*Rearrangement of 3β-acetoxy-11-keto-9β-ergostane.*—3β-acetoxy-11-keto-9β-ergostane (1 g.) and potassium hydroxide (7.5 g.) were heated in refluxing ethanol (50 ml.) for 18 hours. The solution was diluted with water (300 ml.) and extracted with ether (2 x 100 ml.). The combined ether extracts were washed with water (3 x 100 ml.) roughly dried with magnesium sulphate and evaporated to dryness. The residue was reacetylated by treatment with refluxing acetic anhydride (20 ml.) for 20 minutes. Evaporation of the solution to dryness in vacuo followed by crystallisation from aqueous methanol afforded 3-acetoxy-11-ketoergostane (0.78 g.) as needles, M.P. 135–136°, $[\alpha]_D$=+33°. Heusser et al., Helv. Chim. Acta, 1951, 256, 2123, gives M.P. 135–136° $[\alpha]_D$=+32°). (Found: C, 78.50; H, 10.95. $C_{30}H_{50}O_3$ calculated C, 78.55; H, 10.99%.) Mixed melting point with authentic 3β-acetoxy-11-ketoergostane, obtained by catalytic reduction of 3β-acetoxy-11-keto-ergost-22-ene, was undepressed. The infra-red spectrum was identical with the infra-red spectrum of an authentic specimen of 3β-acetoxy-11-ketoergostane.

Example 15

*Rearrangement of 3 - acetoxy - 11 - keto - 9β - ergost-22-ene.*—A solution of 3β-acetoxy-11-keto-9β-ergost-22-ene (1 g.) in ethanol (50 ml.) was heated under reflux with potassium hydroxide (7.5 g.) for 20 hours. The solution was diluted with water (200 ml.) and extracted with ether (2 x 100 ml.). The combined ether extracts were evaporated to dryness and the residue acetylated by heating with acetic anhydride for 20 minutes under reflux. Evaporation of the solvent in vacuo followed by crystallisation of the residue from aqueous methanol, afforded 3β-acetoxy-11-ketoergost-22-ene (0.85 g.) as laths, M.P. 121–124°, $[\alpha]_D$ +13°. Heusser et al., loc. cit., give M.P. 125–126°, $[\alpha]_D$ +12.5°). Found: C, 79.27; H, 10.62. $C_{30}H_{48}O_3$ requires C, 78.89; H, 10.60%.) The melting point was undepressed on admixture with an authentic specimen of 3β-acetoxy-11-ketoergost-22-ene. The infra-red spectrum of the compound was identical with that of authentic 3β-acetoxy-11-ketoergost-22-ene.

Example 16

*3β:5α - dihydroxy - 11 - ketoergostane.*—A solution of 3β:5α-diacetoxy-11-keto-9β-ergostane (2 g.) in ethanol (100 ml.) was heated under reflux with potassium hydroxide (15 g.) for 20 hours. The solution was then diluted with water (200 ml.) and extracted with chloroform (2 x 75 ml.). Evaporation of the combined chloroform extracts in vacuo afforded 3β:5α-dihydroxy-11-ketoergostane (1.23 g.) which crystallised from ethanol as threads, M.P. 229–235°, $[\alpha]_D$=37° (c., 1.15% in chloroform). (Found: C. 77.5; H, 10.9. $C_{28}H_{48}O_3$ requires C, 77.7; H, 11.2.)

Example 17

*3β - acetoxy - 5 - hydroxy - 11 - ketobisnorallocholanic acid methyl ester.*—3β-acetoxy-5α-hydroxy-11-keto-9β-bisnorallocholanic acid methyl ester (500 mg.) in ethanol (25 ml.) containing potassium hydroxide (15%) was refluxed for 15 hours under nitrogen. After dilution with brine and extraction with ether, the aqueous layer was acidified (HCl) and the liberated acid extracted with ether. The ether solution was washed with water, dried and evaporated to the point of crystallisation (50 ml.). Diazomethane in ether (prepared from 0.5 g. nitrosomethyl urea) was then added and the solution stood for 2 hours at room temperature. On evaporation to dryness the solid residue was taken up in acetic anhydride (25 ml.) and the solution refluxed ½ hour. Evaporation of the anhydride left a white crystalline residue which on crystallisation from methanol yielded 3β - acetoxy - 5α - hydroxy - 11 - ketobisnorallocholanic acid methyl ester (135 mg.) M.P. 215–18°, $[\alpha]_D^{20}$ +18.5° (c., 0.65 CHCl$_3$). Light absorption: slight max. 205 m$\mu$.

$E_{1\,cm.}^{1\%}$ 18 (c., 0.005 EtOH)

Infra-red absorption showed bands at 3600 cm.$^{-1}$ (hydroxyl), 1732 and 1236 cm.$^{-1}$ (acetate), 1700 cm.$^{-1}$ (unconjugated carbonyl); 1735 and 1156 cm.$^{-1}$ (ester). Analysis.—Found: C, 69.44; H, 8.92. $C_{25}H_{38}O_6$ requires C, 69.12; H, 8.75.

We claim:
1. A steroid compound having the general formula

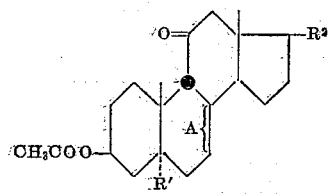

where A is selected from the group consisting of a single bond and a double bond, $R^1$ is a member of the group consisting of a hydrogen atom, a hydroxy group and an acetoxy group and $R^2$ is an organic radical selected from the group consisting of

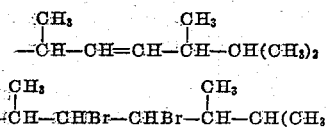

and

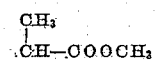

and where the dot at the 9-position signifies the presence of a β-hydrogen atom.

2. 3β-acetoxy-22:23-dibromo-11-keto-9β-ergostane.
3. 3β-acetoxy-11-keto-9β-ergost-22-ene.
4. 3β-acetoxy-11-keto-9β-ergosta-7:22-diene.
5. 3β-acetoxy-22:23-dibromo-11-keto-9β-ergost-7-ene.
6. 3β:5α-diacetoxy-11-keto-9β-ergosta-7:22-diene.
7. A process for the preparation of a steroid compound having the general formula

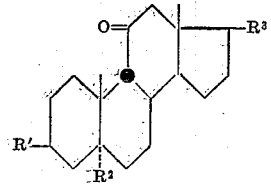

where $R^1$ is a member of the group consisting of a hydroxy group and an acyloxy group derived from a lower alkyl carboxylic acid, $R^2$ is a member of the group consisting of a hydrogen atom, a hydroxy group and an acyloxy group derived from a lower carboxylic acid, $R^3$ is an organic radical selected from the group consisting of

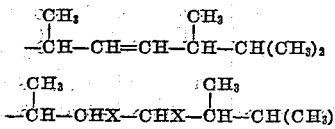

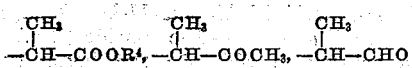

and —CO—CH$_3$, where X is a halogen selected from the group consisting of chlorine and bromine and $R^4$ is a member of the group consisting of hydrogen and a lower alkyl group, and where the dot at the 9-position signifies the presence of a β-hydrogen atom, comprising catalytically hydrogenating in the presence of an inert solvent a steroid compound having the general formula

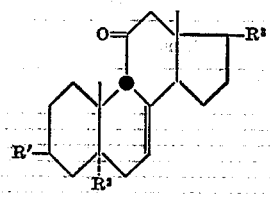

where $R^1$, $R^2$ and $R^3$ have the same meaning as above.

8. A process as claimed in claim 7, in which the hydrogenation catalyst is a member selected from the group consisting of platinum oxide and palladised charcoal.
9. A process as claimed in claim 7, in which the inert organic solvent comprises glacial acetic acid.
10. A process as claimed in claim 7, in which a solution of the starting material in the inert organic solvent is shaken in the presence of the hydrogenation catalyst in an atmosphere of hydrogen at room temperature.
11. A process for the preparation of a compound having the general formula

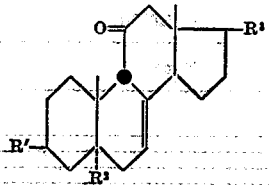

where $R^1$ is a member of the group consisting of a hydroxy group and an acyloxy group derived from a lower alkyl carboxylic acid, $R^2$ is a member of the group consisting of a hydrogen atom, a hydroxy group and an acyloxy group derived from a lower alkyl carboxylic acid, $R^3$ is an organic radical selected from the group consisting of

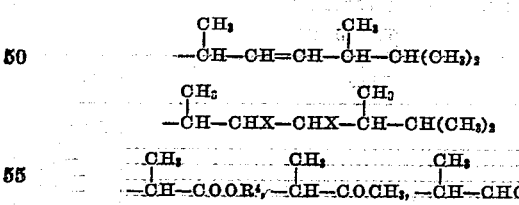

and —CO—CH$_3$, where X is a halogen selected from the group consisting of chlorine and bromine and $R^4$ is a member of the group consisting of hydrogen and a lower alkyl group, and where the dot at the 9-position signifies the presence of a β-hydrogen atom, comprising reacting in the presence of an inert organic solvent a compound having the general formula

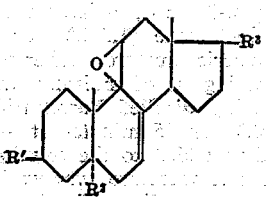

where $R^1$, $R^2$ and $R^3$ have the same meaning as above with a Lewis acid and stopping the reaction at the stage where the optical rotation of the reaction mixture reaches a minimum.

12. A process as claimed in claim 11, in which the Lewis acid is a member of the group consisting of boron trifluoride and stannic chloride.

13. A process as claimed in claim 11, in which from 0.1 to 1.5 mols of Lewis acid are used per mol of starting material.

14. A process as claimed in claim 11, in which the inert organic solvent is an aliphatic ether.

15. A process as claimed in claim 14, in which the aliphatic ether is selected from the group consisting of diethyl ether and tetrahydrofuran.

16. A process as claimed in claim 11, in which the reaction is carried out at temperatures within the range of from −40° to +40° C.

17. A process of converting to the α-configuration a 9β-hydrogen atom of a steroid compound having the general formula

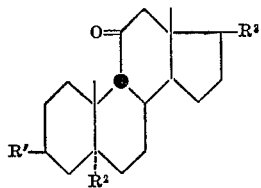

where $R^1$ is a member of the group consisting of a hydroxy group and an acyloxy group derived from a lower alkyl carboxylic acid; $R^2$ is a member of the group consisting of a hydrogen atom, a hydroxy group and an acyloxy group derived from a lower alkyl carboxylic acid and $R^3$ is an organic radical selected from the group consisting of

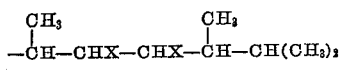

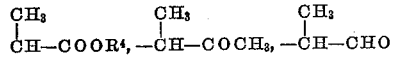

and —CH—CH$_3$, where X is a halogen selected from the group consisting of chlorine and bromine and $R^4$ is a member of the group consisting of hydrogen and a lower alkyl group and where the dot at the 9-position signifies the presence of a β-hydrogen atom, comprising subjecting said steroid compound to strong alkaline conditions.

18. A process as claimed in claim 17, in which the strong alkaline conditions are obtained by the use of an alkaline material selected from the group consisting of alkali metal hydroxides and alkali metal alkoxides, said alkaline material being dissolved in a solvent selected from the group consisting of an alcohol and a mixture of alcohol and water.

19. A process as claimed in claim 18 in which said alkaline material is an alkali metal hydroxide.

References Cited in the file of this patent
UNITED STATES PATENTS

| | | |
|---|---|---|
| 2,345,711 | Marker | Apr. 4, 1944 |
| 2,492,188 | Sarett | Dec. 27, 1949 |
| 2,798,082 | Chemerda et al. | July 2, 1957 |
| 2,837,514 | Chamberlin | June 3, 1958 |